United States Patent
Gonzalez

(10) Patent No.: US 7,290,026 B2
(45) Date of Patent: Oct. 30, 2007

(54) LOW-POWER HIGH-SPEED 4-2 COMPRESSOR WITH MINIMIZED TRANSISTOR COUNT

(75) Inventor: Patrick J. Gonzalez, Walker Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 10/675,811

(22) Filed: Sep. 30, 2003

(65) Prior Publication Data

US 2005/0071416 A1    Mar. 31, 2005

(51) Int. Cl.
*G06F 7/50* (2006.01)

(52) U.S. Cl. .................................... 708/700

(58) Field of Classification Search ................ 708/700
See application file for complete search history.

(56) References Cited

U.S. PATENT DOCUMENTS

| | | | | |
|---|---|---|---|---|
| 5,229,959 A * | 7/1993 | Scriber | ....................... | 708/706 |
| 5,481,206 A * | 1/1996 | New et al. | ..................... | 326/38 |
| 5,523,963 A * | 6/1996 | Hsieh et al. | ................. | 708/707 |
| 5,818,747 A * | 10/1998 | Wong | .......................... | 708/702 |
| 6,904,447 B2 * | 6/2005 | Rhee | ........................... | 708/703 |
| 7,039,667 B1 * | 5/2006 | Awaka et al. | ................ | 708/702 |

OTHER PUBLICATIONS

"A New Low Power CMOS Full Adder", D. Radhakrishnan, MICC and ISCE '99 Proceedings, Nov. 1999, Melaka, Malaysia, pp. 154-157.

* cited by examiner

*Primary Examiner*—D. H. Malzahn
(74) *Attorney, Agent, or Firm*—Lynn L. Augspurger

(57) ABSTRACT

A circuit for use in a microprocessor, comprising
a 4-2 compressor circuit having
a full adder formed of dual XOR/XNOR cells and a 2-1 MUX. The full adder uses minimum sized XOR/XNOR cells.

5 Claims, 3 Drawing Sheets

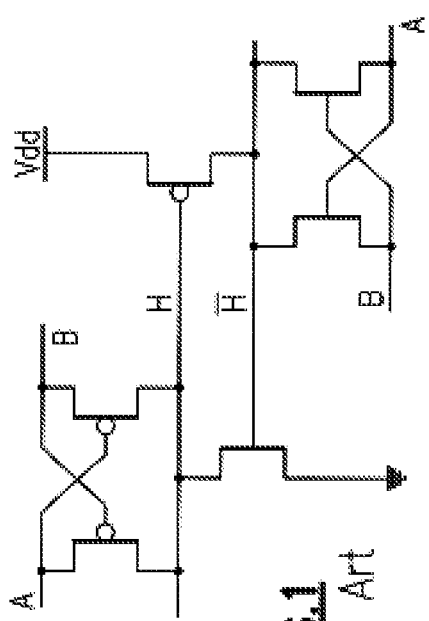
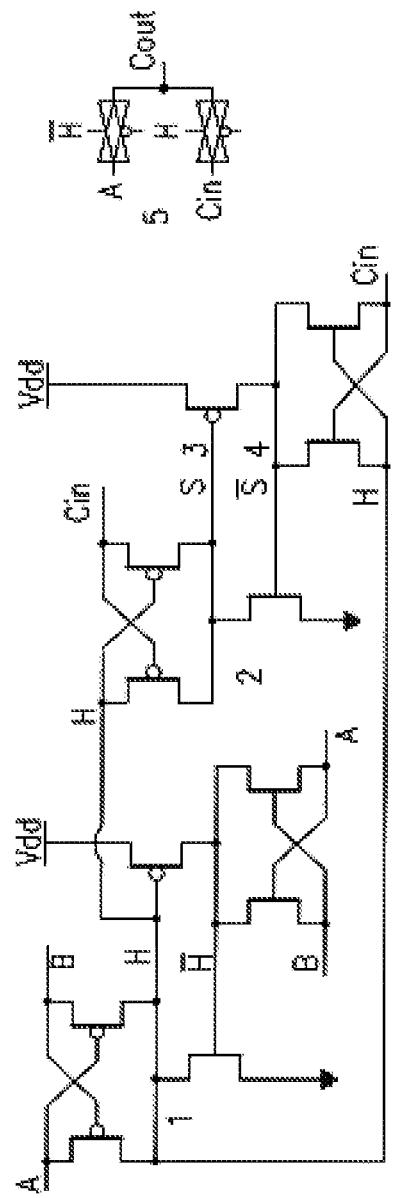
FIG.1 Prior Art
FIG.2
$H = A \oplus B$, $S = H \oplus C_{in}$, $C_{OUT} = \overline{H}(A) + H(C_{in})$

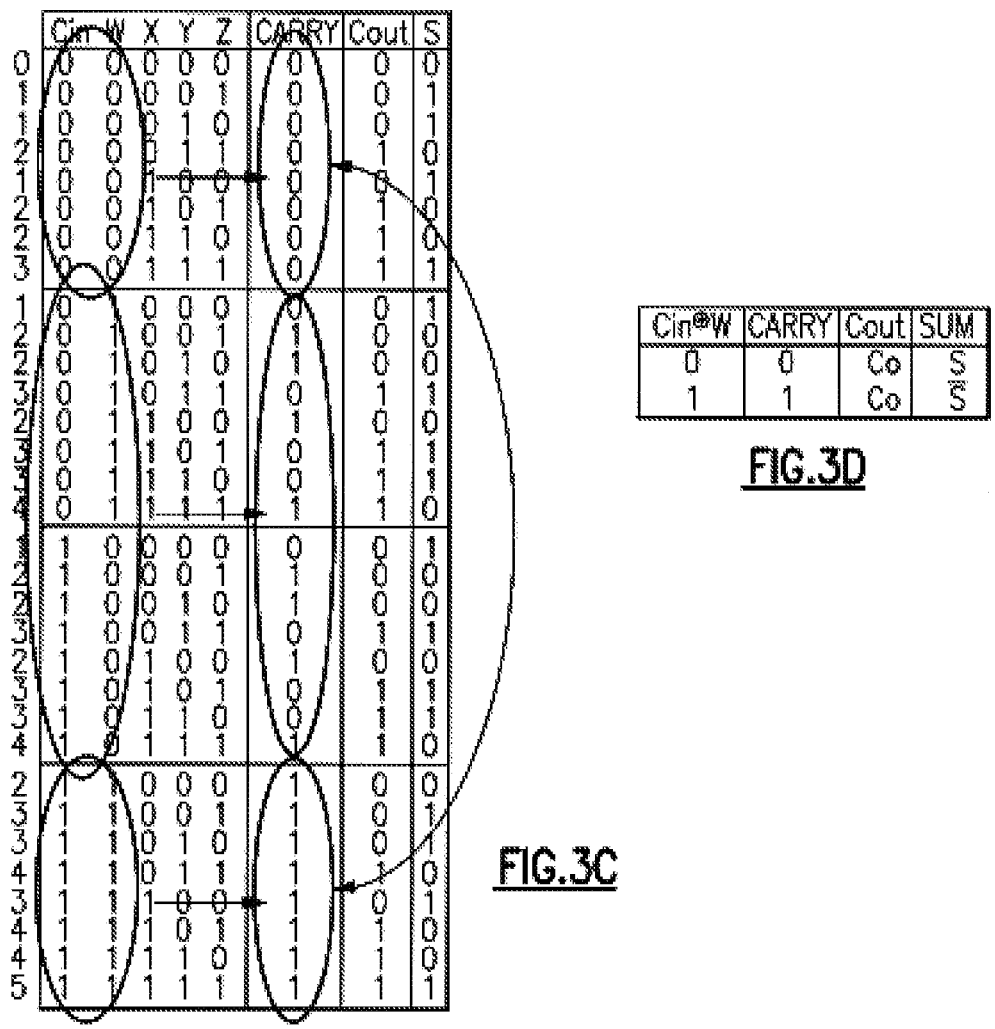
FIG.3C
FIG.3D
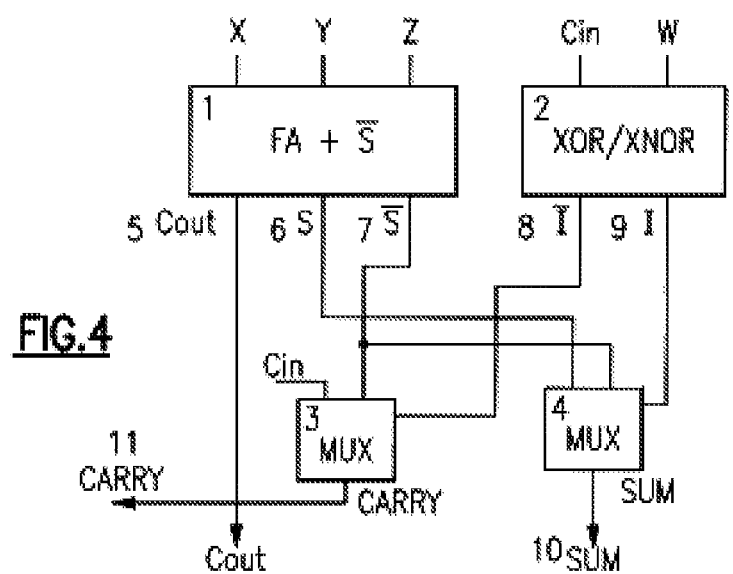
FIG.4

LOW-POWER HIGH-SPEED 4-2 COMPRESSOR WITH MINIMIZED TRANSISTOR COUNT

TRADEMARKS IBM® is a registered trademark of International Business Machines Corporation, Armonk, N.Y., U.S.A. S/390, Z900 and z990 and other names used herein may be registered trademarks, trademarks or product names of International Business Machines Corporation or other companies.

BACKGROUND OF THE INVENTION

1. Field of the Invention

This invention relates to an XOR/XNOR cell, and particularly to a new full adder employing XOR/XNOR cells and a 4-2 compressor design having the full adder circuit.

2. Description of Background

Before the claimed invention in a private and new development Messrs Radhakrishnan and Bayoumi created a new design for an XOR/XNOR cell which was a minimum sized cell and which was then the subject of an investigation during my work at IBM.

SUMMARY OF THE INVENTION

As a result of the investigation of the cell shown in FIG. 1, a new form of a high-speed, low-power, reduced transistor count, 4-2 compressor was created. This investigation led to the described Full Adder improvements which include now preferably the XOR/XNOR cell circuit and to the preferred embodiment of a 4-2 compressor circuit having as an element of the design dual XOR/XNOR cells in the 4-2 compressor circuit.

This unit is a common component in VLSI multipliers can be used for the reduction of partial products. Since multiplication is one of the most used and power hungry operations of DSPs and specialized microprocessors, it is quite evident that a reduction in the power consumption of multipliers is a great resource for improving the overall performance of the processor. This could be used in many levels of technology, such as:

Reducing the power consumption, and hence, the heat dissipation of large scale parallel processor modules.

Extending the battery life (and/or possibly expanding the processing power) of portable pervasive computing devices.

Since partial product reduction is responsible for much of the delay of multiplication, the new compressor may help to increase the performance of many microprocessor/DSP systems.

As a result of the investigation of the cell shown in FIG. 1, a new form of a high-speed, low-power, reduced transistor count, 4-2 compressor was created. This unit is a common component in VLSI multipliers can be used for the reduction of partial products. Since multiplication is one of the most used and power hungry operations of DSPs and specialized microprocessors, it is quite evident that a reduction in the power consumption of multipliers is a great resource for improving the overall performance of the processor. This could be used in many levels of technology, such as:

Reducing the power consumption, and hence, the heat dissipation of large scale parallel processor modules.

Extending the battery life (and/or possibly expanding the processing power) of portable pervasive computing devices.

Since partial product reduction is responsible for much of the delay of multiplication, the new compressor may help to increase the performance of many microprocessor/DSP systems.

Additional advantages may be realized with the 4-2 compressor design of the present invention. Other embodiments and aspects of the invention which may be developed from the circuits described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates the new XOR/XNOR cell used in the investigation as a Damu XOR/XNOR cell (H=A xor B, H'=A xnor B).

FIG. 2 illustrates the preferred embodiment of the invention having a Full adder using minimum sized XOR/XNOR cells and a 2-1 MUX circuit.

FIG. 4 illustrates the complete 4-2 compressor design of the preferred embodiment.

Figures 3A, 3B:
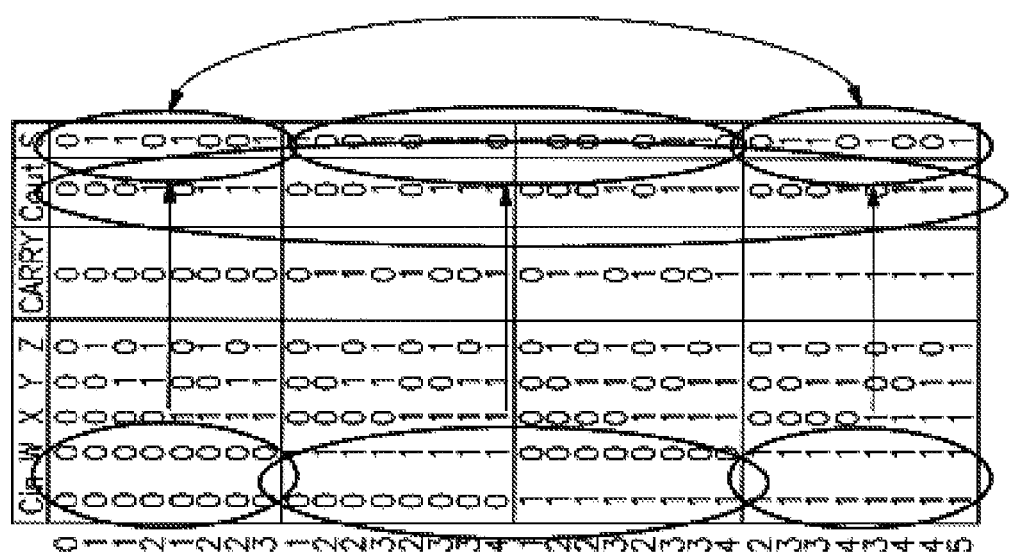
FIG. 3 shows truth tables in FIGS. 3A-3D.

The detailed description explains the preferred embodiments of the invention, together with advantages and features, by way of example with reference to the drawings.

DETAILED DESCRIPTION OF THE INVENTION

This invention was created after an investigation of full adders which are often used in creating 4-2 compressors with a new adder. The adder that was used in the investigation was, in fact, a new design was created using the minimum sized XOR/XNOR cell developed but not published by Messrs Radhakrishnan and Bayoumi. The XOR/XNOR cell used in the investigation can be seen in FIG. 1. It is an improvement on this cell that will be described.

By replicating the XOR/XNOR cell twice as shown in FIG. 2 it will be seen that the sum of the Full Adder (FA) was created. Inclusion of a simple 2-1 MUX is used for the generation of a Cout signal. Accordingly, FIG. 2 illustrates our preferred Full adder using minimum sized XOR/XNOR cells and a 2-1 MUX in the circuit for the new 4-2 compressor. It is a feature of this new circuit that a new complementary sum signal is produced.

FIGS. 3A through 3D develop the truth table for the Full Adder design of the preferred embodiment. FIG. 3A shows a new 4-2 compressor truth table. FIG. 3B shows the 'Sum' output divided into two sections controlled by the XOR/XNOR of the two MSbs of the inputs. Cout is configured such that it is a repetitive pattern in each quarter. FIG. 3C: illustrates the commonalities between Carry and 'Sum, 0, or 1' controlled by XOR/XNOR of 2 MSbs of inputs. Finally, FIG. 3D shows the minimized table with reference to new Full Adder design.

The significance of the new 4-2 compressor developed with the full adder design can now be understood by observing a 4-2 compressor truth table as shown in FIG. 3a. This table was created by modifying the output signals to conform to some specific patterns as shown in FIGS. 3b and 3c. This entire table, once created can be simplified to a very basic table with reference to the Full Adder mentioned earlier and described with respect to FIG. 2. This can be seen in the minimized table of FIG. 3d.

FIG. 4 illustrates the circuit for use in a microprocessor in accordance with the preferred embodiment showing a complete 4-2 compressor design of the preferred embodiment.

Many others have investigated areas of concern with respect to power consumption in VLSI. Some have worked on new designs tor XOR/XNOR, Full Adder, and 4-2 compressor designs. This new design has taken a single minimized XOR/XNOR cell and created a completely new 4-2 compressor. This compressor is also created using a new Full Adder circuit that was also created using the high-speed low-power XOR/XNOR cells. Other 4-2 compressor designs have improved the speed or the power consumption or the size of current designs. This new circuit improves all three of these parameters. By using the XOR/XNOR circuits, improvements are made in both speed and power consumption. And the new design has an overall transistor count of 30 which is equal to some of the smallest 4-2 compressor designs to date.

The speed and power characteristics can also be adjusted by using other XOR/XNOR cells in place of the one shown herein by those of ordinary skill in the art.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

FIG. 1 shows the construction of the full adder circuit with complementary sum which was designed using two of the XOR/XNOR circuits described in Damu Radhakrishnan's paper. The full circuit is comprised bits A and B passed into Damu's (1) XOR/XNOR circuit wherein, the XOR of this unit, along with the carry in bit, are passed into another (2) XOR/XNOR circuit. The outputs of this circuit are (3) a fully-recoverable (to Vdd) Sum and (4) complementary Sum (Sum') of A, B, and Cin. The Cout of the adder is created by passing the Cin and A bits into a (5) pass-logic 2-1 multiplexer.

FIG. 4 shows the completed 4-2 compressor as a 'gray box' design. The complete design is created using: (1) one of the new Full Adder circuits, (2) another instance of the XOR/XNOR cell, and (3,4) two pass-logic 2-1 multiplexers. These cells are connected by having input bits X, Y, and Z passed into the full adder, which generates (5) the first order carry out [Cout], (6) intermediate sum [S], and (7) intermediate complementary sum [S']. The last input bits, W and Cin, are passed into the second XOR/XNOR circuit, generating (9) the intermediate XOR signal [I] and (9) the intermediate XNOR signal [I']. The complementary sum [S'] and the intermediate sum [S] are passed into one of the 2-1 MUXs using the intermediate XOR signal [I] as the control. The output of this MUX is [10] the final sum [SUM]. The complementary sum [S'] and the carry-in bit [Cin] are passed into the final 2-1 MUX. By using the intermediate XNOR as the control signal, the [11] second order carry out [Carry] is generated.

What is claimed is:

1. A circuit for use in a microprocessor, comprising a 4-2 compressor circuit which includes a full adder, said full adder providing a Carry out, a Sum and a complementary sum output signal, and including a first and one other instance of XOR/XNOR cells and two passlogic 2-1 multiplexors, each of said multiplexors being coupled said XOR/XNOR cells.

2. The circuit according to claim 1 wherein the 4-2 compressor circuit with a full adder and XOR/XNOR cells is connected by having three input bits (FIG. 4, X, Y and Z) of said 4-2 compressor circuit passed into the full adder, which full adder generates said Carry out signal as a first order carry out (Cout), and said intermediate sum (S), and said intermediate complementary sum (S') and having last input bits (W and Cin) passed into a further third instance of said XOR/XNOR cells.

3. The circuit according to claim 2 wherein said last input bits (W and Cin) are passed into said further third instance of said XOR/XNOR cells and generate an intermediate XOR signal (I) and an intermediate XNOR signal (I').

4. The circuit according to claim 3 wherein a complementary sum (S') and an intermediate sum (S) are passed into one of the 2-1 MUXs using said intermediate XOR signal (I) as a control signal and wherein the output of said one of the 2-1 MUXs is (10) the final sum Sum) and said complementary sum (S') and a carryin bit (Cin) are passed into another of said 2-1 MUXs.

5. The circuit according to claim 4 wherein said intermediate XNOR is used as the control signal and a (11) second order carry out (Carry) is generated.

* * * * *